US012771680B2

(12) United States Patent
Walsh et al.

(10) Patent No.: US 12,771,680 B2
(45) Date of Patent: *Oct. 20, 2026

(54) SYSTEM, METHOD, AND COMPUTER PROGRAM PRODUCT FOR MANAGING COMPUTATIONAL CLUSTER ACCESS TO MULTIPLE DOMAINS

(71) Applicant: Visa International Service Association, San Francisco, CA (US)

(72) Inventors: Robert E. Walsh, Foster City, CA (US); Amit Sharma, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/791,498

(22) Filed: Aug. 1, 2024

(65) Prior Publication Data

US 2024/0396885 A1 Nov. 28, 2024

Related U.S. Application Data

(63) Continuation of application No. 17/118,735, filed on Dec. 11, 2020, now Pat. No. 12,088,576.

(60) Provisional application No. 62/947,675, filed on Dec. 13, 2019.

(51) Int. Cl.
*H04L 9/40* (2022.01)

(52) U.S. Cl.
CPC ........ *H04L 63/0807* (2013.01); *H04L 63/168* (2013.01)

(58) Field of Classification Search
None
See application file for complete search history.

(56) References Cited

U.S. PATENT DOCUMENTS 5,768,519 A 6/1998 Swift et al.
7,165,060 B2 * 1/2007 Foster .................... G06Q 10/10
9,900,317 B2 2/2018 Cantrill et al.
10,250,723 B2 4/2019 Khanduja et al.
(Continued)

OTHER PUBLICATIONS

Gaikwad et al., Network Security Enhancement in Hadoop Clusters , Mar. 2013, IJAIEM, 7 Pages (Year: 2013).*
(Continued)

*Primary Examiner* — Christopher C Harris
(74) *Attorney, Agent, or Firm* — The Webb Law Firm

(57) ABSTRACT

A computer-implemented method for managing computational cluster access to multiple domains includes generating, using a ticket-based computer network authentication protocol, a primary set of keys based on remote system access credentials for a primary domain and a secondary set of keys based on remote system access credentials for a secondary domain. The method includes merging the primary set of keys with the secondary set of keys to form a merged set of keys. The method further includes activating a system daemon to provide access to the primary domain and the secondary domain by a computational cluster based on the merged set of keys. The method further includes connecting, using the ticket-based computer network authentication protocol via the system daemon, a remote computing device of the primary domain and a remote computing device of the secondary domain to the computational cluster.

20 Claims, 8 Drawing Sheets

(56) References Cited

U.S. PATENT DOCUMENTS

| | | | |
|---|---|---|---|
| 2002/0078243 A1 | 6/2002 | Rich et al. | |
| 2009/0055477 A1* | 2/2009 | Flesher | H04L 63/302 709/204 |
| 2009/0094674 A1* | 4/2009 | Schwartz | H04L 63/302 709/204 |
| 2011/0191834 A1* | 8/2011 | Singh | G06F 9/455 718/1 |
| 2011/0213965 A1* | 9/2011 | Fu | H04L 63/0823 709/248 |
| 2014/0325214 A1* | 10/2014 | Sadrolashrafi | G06F 21/6218 713/165 |
| 2017/0048223 A1 | 2/2017 | Anantha Padmanaban et al. | |
| 2017/0339156 A1 | 11/2017 | Gupta et al. | |
| 2018/0083915 A1* | 3/2018 | Medam | H04L 61/10 |
| 2018/0324159 A1 | 11/2018 | Koya et al. | |
| 2019/0007409 A1 | 1/2019 | Totale et al. | |
| 2019/0205173 A1 | 7/2019 | Gupta et al. | |
| 2019/0349262 A1 | 11/2019 | Miedema et al. | |
| 2020/0092286 A1* | 3/2020 | Han | G06F 9/45558 |
| 2020/0092331 A1 | 3/2020 | Li et al. | |

OTHER PUBLICATIONS

Migeon, The MIT Kerberos Administrator's How-to Guide Protocol, Installation and Single Sign on, The MIT Kerberos Consortium, Jul. 2008, (Year: 2008).*

8.2.5. Configuring Domains, Fedora Project, 2019, pp. 1-9, Red Hat.

11.5. Setting up Cross-Realm Kerberos Trusts, Red Hat Customer Portal, 2019, pp. 1-10, Red Hat.

Configuring a Cluster-Dedicated MIT KDC with Cross-Realm Trust, Cloudera Documentation, Apr. 10, 2019, pp. 1-9, Cloudera.

Gawinski et al., Hadoop Elephant in Active Directory Forest, 2016, pp. 1-25, Allegro.tech.

Hanzelka et al., Red Hat Enterprise Linux 7: System-Level Authentication Guide, Oct. 26, 2018, pp. 1-152, Red Hat.

Hanzelka et al., Red Hat Enterprise Linux 7: Windows Integration Guide, Oct. 26, 2018, pp. 1-116, Red Hat.

How to Configure Cloudera Navigator to Access Multiple Active Directory/LDAP Servers, Support Questions, Jul. 2018, pp. 1-8, Cloudera.

How to connect Kerberos with multiple LDAP servers?, 2017, pp. 1-2, Unix & Linux Stack Exchange.

Integrating with a Windows server using the AD provider, SSSD Documentation, 2019, pp. 1-15, Red Hat.

Kerberos Authentication against Multiple Domains, Access Manager Tips & Information, Oct. 10, 2013, pp. 1-7, Micro Focus Community.

Melander, Part 1 of 4—SSSD Linux Authentication: Introduction and Architecture, A-Team Chronicles, Dec. 6, 2017, pp. 1-9, Oracle.

Red Hat Private Support Forum Post, Sep. 24, 2019, pp. 1-4.

SSSD—System Security Services Daemon, SSSD Documentation, 2019, pp. 1-2, Red Hat.

Use a Keytab, Knowledge Base, Jul. 10, 2019, pp. 1-6, Indiana University.

* cited by examiner

SYSTEM, METHOD, AND COMPUTER PROGRAM PRODUCT FOR MANAGING COMPUTATIONAL CLUSTER ACCESS TO MULTIPLE DOMAINS

CROSS REFERENCE TO RELATED APPLICATIONS

This application is a continuation of U.S. patent application Ser. No. 17/118,735, filed Dec. 11, 2020, which claims priority to U.S. Provisional Patent Application No. 62/947,675, filed Dec. 13, 2019, the disclosures of which are hereby incorporated by reference in their entireties.

BACKGROUND

1. Field

This disclosure relates generally to computational clusters and, in some non-limiting embodiments, to a system, method, and computer program product for managing access by computational clusters to multiple domains.

2. Technical Considerations

Computational clusters, e.g., Hadoop server clusters, may be set up for access to users/accounts in a domain, e.g., an Active Directory domain. Difficulties are encountered when attempting to configure a computational cluster for independent and/or simultaneous access to multiple domains.

Additionally, difficulties may be encountered in allowing a computational cluster provider to isolate users, services, and applications to a domain of choice and exercise exclusive control over them. Also, difficulties may be encountered in allowing a computational cluster to access user and service accounts from any one of many associated domains. Further, difficulties may be encountered in secure isolation and protection of critical accounts that are used by cluster services and applications across multiple domains.

SUMMARY

Accordingly, it is an object of the presently disclosed subject matter to provide systems, methods, and computer program products for managing computational cluster access to multiple domains.

According to some non-limiting embodiments or aspects, provided is a method for managing computational cluster access to multiple domains. The method may include generating, with at least one processor using a ticket-based computer network authentication protocol, a primary set of keys based on remote system access credentials for a primary domain and at least one secondary set of keys based on remote system access credentials for at least one secondary domain. The method may also include merging, with at least one processor, the primary set of keys with the at least one secondary set of keys to form a merged set of keys. The method may also include activating, with at least one processor, a system daemon to provide access to the primary domain and the at least one secondary domain by a computational cluster based on the merged set of keys. The method may further include connecting, with at least one processor and using the ticket-based computer network authentication protocol via the system daemon, a remote computing device of the primary domain and a remote computing device of the at least one secondary domain to the computational cluster. The method may include receiving, with at least one processor, a first cluster access request to access a domain account associated with the remote computing device of the primary domain. The method may include authenticating, with at least one processor, the first cluster access request via the ticket-based computer network authentication protocol. The method may include receiving, with at least one processor, a second cluster access request to access a domain account associated with the remote computing device of the at least one secondary domain. The method may include authenticating, with at least one processor, the second cluster access request via the ticket-based computer network authentication protocol.

In some non-limiting embodiments or aspects, the at least one secondary domain may include a plurality of secondary domains.

In some non-limiting embodiments or aspects, the method may include configuring, with at least one processor, the ticket-based computer network authentication protocol to communicate with the primary domain and the at least one secondary domain.

In some non-limiting embodiments or aspects, configuring the ticket-based computer network authentication protocol may include activating an authentication service and a ticket-granting service on a domain controller for each of the primary domain and the at least one secondary domain.

In some non-limiting embodiments or aspects, generating the primary set of keys and the at least one secondary set of keys may also include initiating, with at least one processor, a discovery scan for each domain associated with each set of keys; installing, with at least one processor, data packages required to join the computational cluster to each domain associated with each set of keys; and joining, with at least one processor, the computational cluster to each domain associated with each set of keys.

In some non-limiting embodiments or aspects, each key of the merged set of keys may include an identifier of a domain account associated with an encryption key necessary to encrypt or decrypt a ticket of the ticket-based computer network authentication protocol.

In some non-limiting embodiments or aspects, the primary set of keys and the at least one secondary set of keys may include different sets of permissions of remote system access credentials.

According to some non-limiting embodiments or aspects, provided is a system for managing computational cluster access to multiple domains. The system may include a server including at least one processor. The server may be programmed and/or configured to generate, using a ticket-based computer network authentication protocol, a primary set of keys based on remote system access credentials for a primary domain and at least one secondary set of keys based on remote system access credentials for at least one secondary domain. The server may be programmed and/or configured to merge the primary set of keys with the at least one secondary set of keys to form a merged set of keys. The server may be programmed and/or configured to activate a system daemon to provide access to the primary domain and the at least one secondary domain by a computational cluster based on the merged set of keys. The server may be programmed and/or configured to connect, using the ticket-based computer network authentication protocol via the system daemon, a remote computing device of the primary domain and a remote computing device of the at least one secondary domain to the computational cluster. The server may be programmed and/or configured to receive a first cluster access request to access a domain account associated with the remote computing device of the primary domain.

The server may be programmed and/or configured to authenticate the first cluster access request via the ticket-based computer network authentication protocol. The server may be programmed and/or configured to receive a second cluster access request to access a domain account associated with the remote computing device of the at least one secondary domain. The server may be programmed and/or configured to authenticate the second cluster access request via the ticket-based computer network authentication protocol.

In some non-limiting embodiments or aspects, the at least one secondary domain may include a plurality of secondary domains.

In some non-limiting embodiments or aspects, the server may be further programmed and/or configured to configure the ticket-based computer network authentication protocol to communicate with the primary domain and the at least one secondary domain.

In some non-limiting embodiments or aspects, configuring the ticket-based computer network authentication protocol may include activating an authentication service and a ticket-granting service on a domain controller for each of the primary domain and the at least one secondary domain.

In some non-limiting embodiments or aspects, generating the primary set of keys and the at least one secondary set of keys may further include: initiating a discovery scan for each domain associated with each set of keys; installing data packages required to join the computational cluster to each domain associated with each set of keys; and joining the computational cluster to each domain associated with each set of keys.

In some non-limiting embodiments or aspects, each key of the merged set of keys may include an identifier of a domain account associated with an encryption key necessary to encrypt or decrypt a ticket of the ticket-based computer network authentication protocol.

In some non-limiting embodiments or aspects, the primary set of keys and the at least one secondary set of keys may include different sets of permissions of remote system access credentials.

According to some non-limiting embodiments or aspects, provided is a computer program product for managing computational cluster access to multiple domains. The computer program product may include at least one non-transitory computer-readable medium including program instructions that, when executed by at least one processor, cause the at least one processor to generate, using a ticket-based computer network authentication protocol, a primary set of keys based on remote system access credentials for a primary domain and at least one secondary set of keys based on remote system access credentials for at least one secondary domain. The program instructions may cause the at least one processor to merge the primary set of keys with the at least one secondary set of keys to form a merged set of keys. The program instructions may cause the at least one processor to activate a system daemon to provide access to the primary domain and the at least one secondary domain by a computational cluster based on the merged set of keys. The program instructions may cause the at least one processor to connect, using the ticket-based computer network authentication protocol via the system daemon, a remote computing device of the primary domain and a remote computing device of the at least one secondary domain to the computational cluster. The program instructions may cause the at least one processor to receive a first cluster access request to access a domain account associated with the remote computing device of the primary domain. The program instructions may cause the at least one processor to authenticate the first cluster access request via the ticket-based computer network authentication protocol. The program instructions may cause the at least one processor to receive a second cluster access request to access a domain account associated with the remote computing device of the at least one secondary domain. The program instructions may cause the at least one processor to authenticate the second cluster access request via the ticket-based computer network authentication protocol.

In some non-limiting embodiments or aspects, the program instructions may further cause the at least one processor to configure the ticket-based computer network authentication protocol to communicate with the primary domain and the at least one secondary domain.

In some non-limiting embodiments or aspects, configuring the ticket-based computer network authentication protocol may include activating an authentication service and a ticket-granting service on a domain controller for each of the primary domain and the at least one secondary domain.

In some non-limiting embodiments or aspects, generating the primary set of keys and the at least one secondary set of keys may include: initiating a discovery scan for each domain associated with each set of keys; installing data packages required to join the computational cluster to each domain associated with each set of keys; and joining the computational cluster to each domain associated with each set of keys.

In some non-limiting embodiments or aspects, each key of the merged set of keys may include an identifier of a domain account associated with an encryption key necessary to encrypt or decrypt a ticket of the ticket-based computer network authentication protocol.

In some non-limiting embodiments or aspects, the primary set of keys and the at least one secondary set of keys may include different sets of permissions of remote system access credentials.

Further embodiments or aspects are set forth in the following numbered clauses:

Clause 1: A computer-implemented method comprising: generating, with at least one processor using a ticket-based computer network authentication protocol, a primary set of keys based on remote system access credentials for a primary domain and at least one secondary set of keys based on remote system access credentials for at least one secondary domain; merging, with at least one processor, the primary set of keys with the at least one secondary set of keys to form a merged set of keys; activating, with at least one processor, a system daemon to provide access to the primary domain and the at least one secondary domain access by a computational cluster based on the merged set of keys; connecting, with at least one processor and using the ticket-based computer network authentication protocol via the system daemon, a remote computing device of the primary domain and a remote computing device of the at least one secondary domain to the computational cluster; receiving, with at least one processor, a first cluster access request to access a domain account associated with the remote computing device of the primary domain; authenticating, with at least one processor, the first cluster access request via the ticket-based computer network authentication protocol; receiving, with at least one processor, a second cluster access request to access a domain account associated with the remote computing device of the at least one secondary domain; and authenticating, with at least one processor, the second cluster access request via the ticket-based computer network authentication protocol.

Clause 2: The method of clause 1, wherein the at least one secondary domain comprises a plurality of secondary domains.

Clause 3: The method of clause 1 or clause 2, further comprising configuring, with at least one processor, the ticket-based computer network authentication protocol to communicate with the primary domain and the at least one secondary domain.

Clause 4: The method of any of clauses 1-3, wherein configuring the ticket-based computer network authentication protocol comprises activating an authentication service and a ticket-granting service on a domain controller for each of the primary domain and the at least one secondary domain.

Clause 5: The method of any of clauses 1-4, wherein generating the primary set of keys and the at least one secondary set of keys further comprises: initiating, with at least one processor, a discovery scan for each domain associated with each set of keys; installing, with at least one processor, data packages required to join the computational cluster to each domain associated with each set of keys; and joining, with at least one processor, the computational cluster to each domain associated with each set of keys.

Clause 6: The method of any of clauses 1-5, wherein each key of the merged set of keys comprises an identifier of a domain account associated with an encryption key necessary to encrypt or decrypt a ticket of the ticket-based computer network authentication protocol.

Clause 7: The method of any of clauses 1-6, wherein the primary set of keys and the at least one secondary set of keys comprise different sets of permissions of remote system access credentials.

Clause 8: A system comprising a server comprising at least one processor, the server being programmed and/or configured to: generate, using a ticket-based computer network authentication protocol, a primary set of keys based on remote system access credentials for a primary domain and at least one secondary set of keys based on remote system access credentials for at least one secondary domain; merge the primary set of keys with the at least one secondary set of keys to form a merged set of keys; activate a system daemon to provide access to the primary domain and the at least one secondary domain by a computational cluster based on the merged set of keys; and connect, using the ticket-based computer network authentication protocol via the system daemon, a remote computing device of the primary domain and a remote computing device of the at least one secondary domain to the computational cluster.

Clause 9: The system of clause 9, wherein the at least one secondary domain comprises a plurality of secondary domains.

Clause 10: The system of clause 8 or clause 9, wherein the server is further programmed and/or configured to configure the ticket-based computer network authentication protocol to communicate with the primary domain and the at least one secondary domain.

Clause 11: The system of any of clauses 8-10, wherein configuring the ticket-based computer network authentication protocol comprises activating an authentication service and a ticket-granting service on a domain controller for each of the primary domain and the at least one secondary domain.

Clause 12: The system of any of clauses 8-11, wherein generating the primary set of keys and the at least one secondary set of keys further comprises: initiating a discovery scan for each domain associated with each set of keys; installing data packages required to join the computational cluster to each domain associated with each set of keys; and joining the computational cluster to each domain associated with each set of keys.

Clause 13: The system of any of clauses 8-12, wherein each key of the merged set of keys comprises an identifier of a domain account associated with an encryption key necessary to encrypt or decrypt a ticket of the ticket-based computer network authentication protocol.

Clause 14: The system of any of clauses 8-13, wherein the primary set of keys and the at least one secondary set of keys comprise different sets of permissions of remote system access credentials.

Clause 15: A computer program product comprising at least one non-transitory computer-readable medium including program instructions that, when executed by at least one processor, cause the at least one processor to: generate, using a ticket-based computer network authentication protocol, a primary set of keys based on remote system access credentials for a primary domain and at least one secondary set of keys based on remote system access credentials for at least one secondary domain; merge the primary set of keys with the at least one secondary set of keys to form a merged set of keys; activate a system daemon to provide access to the primary domain and the at least one secondary domain by a computational cluster based on the merged set of keys; and connect, using the ticket-based computer network authentication protocol via the system daemon, a remote computing device of the primary domain, a remote computing device of the at least one secondary domain, or any combination thereof to the computational cluster.

Clause 16: The computer program product of clause 15, wherein the program instructions further cause the at least one processor to configure the ticket-based computer network authentication protocol to communicate with the primary domain and the at least one secondary domain.

Clause 17: The computer program product of clause 15 or clause 16, wherein configuring the ticket-based computer network authentication protocol comprises activating an authentication service and a ticket-granting service on a domain controller for each of the primary domain and the at least one secondary domain.

Clause 18: The computer program product of any of clauses 15-17, wherein generating the primary set of keys and the at least one secondary set of keys further comprises: initiating a discovery scan for each domain associated with each set of keys; installing data packages required to join the computational cluster to each domain associated with each set of keys; and joining the computational cluster to each domain associated with each set of keys.

Clause 19: The computer program product of any of clauses 15-18, wherein each key of the merged set of keys comprises an identifier of a domain account associated with an encryption key necessary to encrypt or decrypt a ticket of the ticket-based computer network authentication protocol.

Clause 20: The computer program product of any of clauses 15-19, wherein the primary set of keys and the at least one secondary set of keys comprise different sets of permissions of remote system access credentials.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
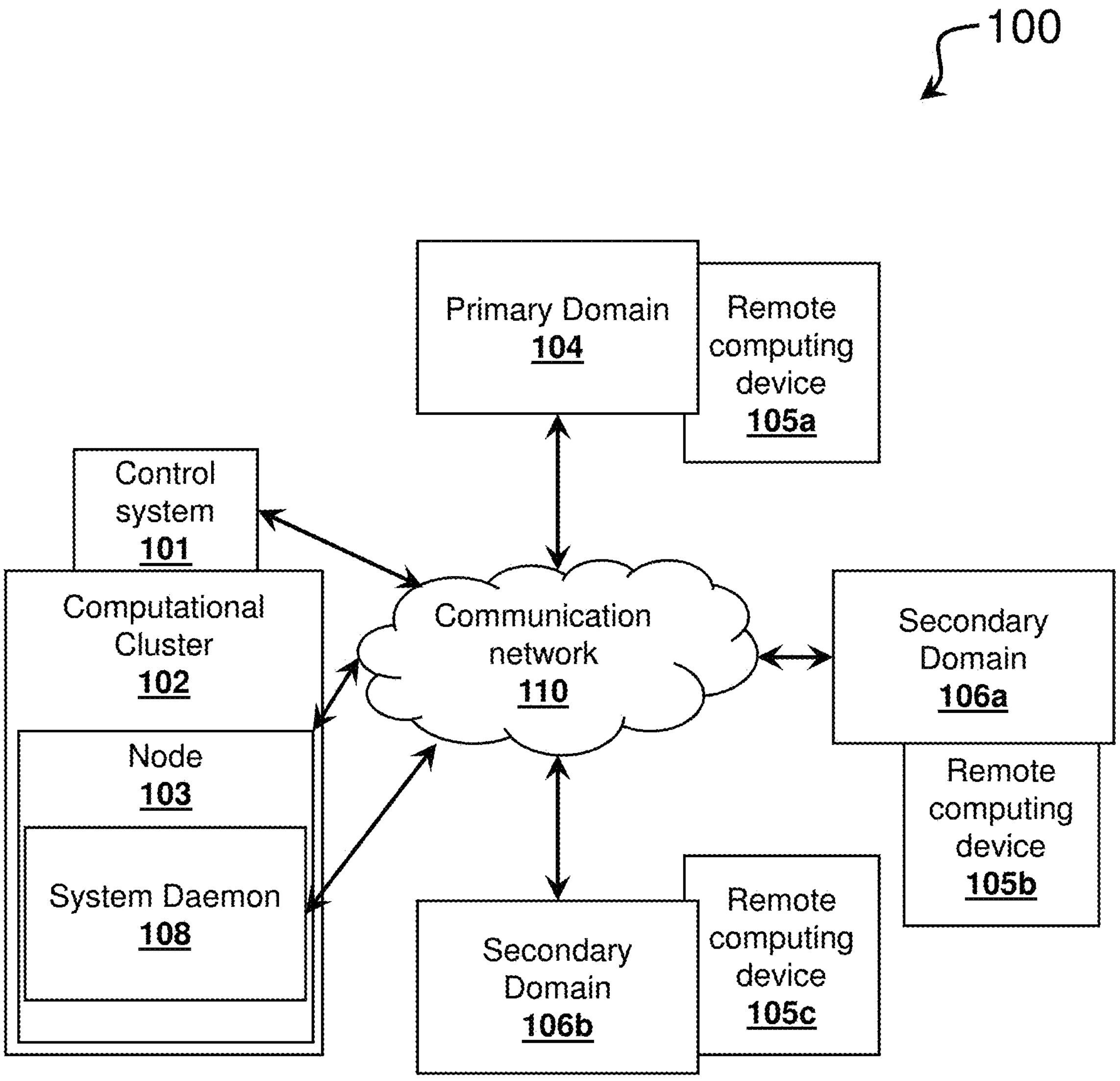
FIG. 1 is a diagram of a non-limiting embodiment of an environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function. As further used herein, the term "server" may refer to a member node of a computational cluster.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments, a payment token may be "format preserving" and may have a numeric format that conforms to the account identifiers used in existing payment processing networks (e.g., ISO 8583 financial transaction message format). In some non-limiting embodiments, a payment token may be used in place of a PAN to initiate, authorize, settle, or resolve a payment transaction or represent the original credential in other systems where the original credential would typically be provided. In some non-limiting embodiments, a token value may be generated such that the recovery of the original PAN or other account identifier from the token value may not be computationally derived (e.g., with a one-way hash or other cryptographic function). Further, in some non-limiting embodiments, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally, or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally, or alternatively, a token requestor may no longer need to store a PAN associated with a token once the requestor has received the payment token in response to a token request message. In some non-limiting embodiments, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments, a requestor may interface with a network token system through any suitable communication network and/or protocol (e.g., using HTTPS, SOAP and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments, a token requestor may request tokens for multiple domains and/or channels. Additionally, or alternatively, a token requestor may be registered and identified uniquely by the token service provider within the tokenization ecosystem. For example, during token requestor registration, the token service provider may formally process a token requestor's application to participate in the token service system. In some non-limiting embodiments, the token service provider may collect information pertaining to the nature of the requestor and relevant use of tokens to validate and formally approve the token requestor and establish appropriate domain restriction controls. Additionally, or alternatively, successfully registered token requestors may be assigned a token requestor identifier that may also be entered and maintained within the token vault. In some non-limiting embodiments, token requestor identifiers may be revoked and/or token requestors may be assigned new token requestor identifiers. In some non-limiting embodiments, this information may be subject to reporting and audit by the token service provider.

As used herein, the term a "token service provider" may refer to an entity including one or more server computers in a token service system that generates, processes and maintains payment tokens. For example, the token service provider may include or be in communication with a token vault where the generated tokens are stored. Additionally, or alternatively, the token vault may maintain one-to-one mapping between a token and a PAN represented by the token. In some non-limiting embodiments, the token service provider may have the ability to set aside licensed BINs as token BINs to issue tokens for the PANs that may be submitted to the token service provider. In some non-limiting embodiments, various entities of a tokenization ecosystem may assume the roles of the token service provider. For example, payment networks and issuers or their agents may become the token service provider by implementing the token services according to non-limiting embodiments of the presently disclosed subject matter. Additionally, or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments, the token vault may be a part of a token service system. For example, the token vault may be provided as a part of the token service provider. Additionally or alternatively, the token vault may be a remote repository accessible by the token service provider. In some non-limiting embodiments, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

Non-limiting embodiments or aspects of the present disclosure are directed to systems, methods, and computer program products for managing computational cluster access to multiple domains. The present disclosure is generally directed to a specific implementation scheme for connectivity of a computational cluster (e.g., coordinated set of computing devices which may simultaneously work on a same task) with multiple domains (e.g., a logical group of networked objects (e.g., computers, users, devices, etc.) that may share a same directory database). Included are technical solutions to configure a ticket-based computer network authentication protocol to use dual or higher plurality realms (e.g., domains over which an authentication server has the authority to authenticate users, hosts, and/or services). The ticket-based computer network authentication protocol may operate on the basis of tickets (e.g., data certificates issued by an authentication server that provides proof of identity) to allow computing devices of a computational cluster to communicate over a network and prove their identity in a secure manner. Included are technical solutions to configure a system daemon (e.g., a computer program that runs as a background process on a computing device) associated with a computational cluster to utilize two or more domains. The present disclosure provides a technical solution that allows a computational cluster provider (e.g., host) to isolate users, services, and applications to a domain of choice and exercise exclusive control over them. The present disclosure further provides a technical solution that allows a computational cluster to access user and service accounts from any one of many associated domains. The described systems and methods provide isolation and protection of critical accounts that are used by cluster services and applications across multiple domains. Described systems and methods simplify (e.g., reduce required computer resources, steps, and time for) the process of configuring a computational cluster's network communications over multiple domains.

For the purpose of illustration, in the following description, while the presently disclosed subject matter is described with respect to methods, systems, and computer program products for managing access by computational clusters, e.g., to multiple domains, one skilled in the art will recognize that the disclosed subject matter is not limited to the illustrative embodiments. For example, the methods, systems, and computer program products described herein may be used with a wide variety of settings, such as managing access by computational clusters in any setting suitable for using such computational clusters. Described systems and methods may be executed for multiple computational clusters to be governed by multiple, independent domains. Each computational cluster described herein may include a plurality of nodes (e.g., a Linux server). The present disclosure provides for each node in a computational cluster to utilize any domain for authentication, authorization, access control, and/or auditing of users, applications, and groups. The present disclosure provides for a union of multiple domains that may govern (e.g., manage) a computational cluster as a whole, including all users, applications, groups, and nodes.

Referring now to FIG. 1, illustrated is a diagram of an example environment 100 in which devices, systems, and/or methods, described herein, may be implemented. As shown in FIG. 1, environment 100 includes computational cluster 102 (e.g., a Hadoop server cluster), a control system 101 associated with the computational cluster 102, one or more nodes 103 (e.g., servers), primary domain 104 (e.g., an Active Directory domain), one or more secondary domains 106*a*,106*b* (e.g., Active Directory domain(s)), one or more remote computing devices 105*a*,105*b*,105*c*, system daemon 108 (e.g., a system security services daemon (SSSD)), and/or communication network 110. While the terms "primary" and "secondary" may be used herein to differentiate between a first and one or more additional domains, the domains may be treated equivalently in the described system, without any connotation of primacy.

Computational cluster 102 may include one or more devices capable of being in communication with primary domain 104 and/or one or more secondary domains 106*a*, 106*b* via communication network 110, including one or more servers/nodes 103. System daemon 108 may also be associated or included with the computational cluster 102, on a server/node 103. In some non-limiting embodiments or aspects, computational cluster 102 may include one or more computing devices, such as a server, a group of servers, and/or other like devices. Said computing devices may include data storage devices, which may be local or remote to computational cluster 102. In some non-limiting embodiments or aspects, computational cluster 102 may be capable of receiving information from, storing information in, communicating information to, or searching information stored in the data storage device. Computational cluster 102 may include a ticket-based computer network authentication protocol (e.g., Kerberos) for connecting domain accounts for access by computational cluster 102. The ticket-based computer network authentication protocol may make use of symmetric key cryptography and a trusted third party for authentication. Tickets may be issued by a key distribution server.

Primary domain 104 may include a network of one or more devices (e.g., remote computing device 105*a*) capable of being in communication with computational cluster 102, one or more secondary domains 106*a*,106*b*, and/or system daemon 108 via communication network 110. For example, primary domain 104 may include one or more computing devices (e.g., remote computing device 105*a*), designated by user, group, and/or the like, including one or more laptop computers, one or more servers, one or more desktop computers, one or more mobile devices, one or more smartphones, and/or the like. Reference herein to communication with a primary domain 104 may include communication with one or more devices thereof (e.g., remote computing device 105*a*).

Each secondary domain (e.g., secondary domains 106*a*, 106*b*) may include one or more devices (e.g., remote computing devices 105*b*,105*c*) capable of being in communication with computational cluster 102, primary domain 104, and/or system daemon 108 via communication network 110. For example, each secondary domain (e.g., secondary domains 106*a*,106*b*) may include one or more computing devices (e.g., remote computing devices 105*b*,105*c*), designated by user, group, and/or the like, including one or more laptop computers, one or more servers, one or more desktop computers, one or more mobile devices, one or more smartphones, and/or the like. Reference herein to communication with a secondary domain 106*a*,106*b* may include communication with one or more devices thereof (e.g., remote computing devices 105*b*,105*c*).

System daemon 108 may include a computer program of a computing device, including a background process for management of computational cluster 102. System daemon 108 may be capable of being in communication with one or more devices of computational cluster 102, primary domain 104, and/or one or more secondary domains 106*a*,106*b* via communication network 110. System daemon 108 may be operated on a node 103 of a computational cluster 102.

Control system 101 may include one or more computing devices configured to control (e.g., manage communications with) the computational cluster 102. Control system 101 may include one or more computing devices within and/or external to the computational cluster 102. Control system 101 may be associated with and/or include one or more same computing devices as the system daemon 108, the node 103, and/or the computational cluster 102.

Communication network 110 may include one or more wired and/or wireless networks. For example, communication network 110 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
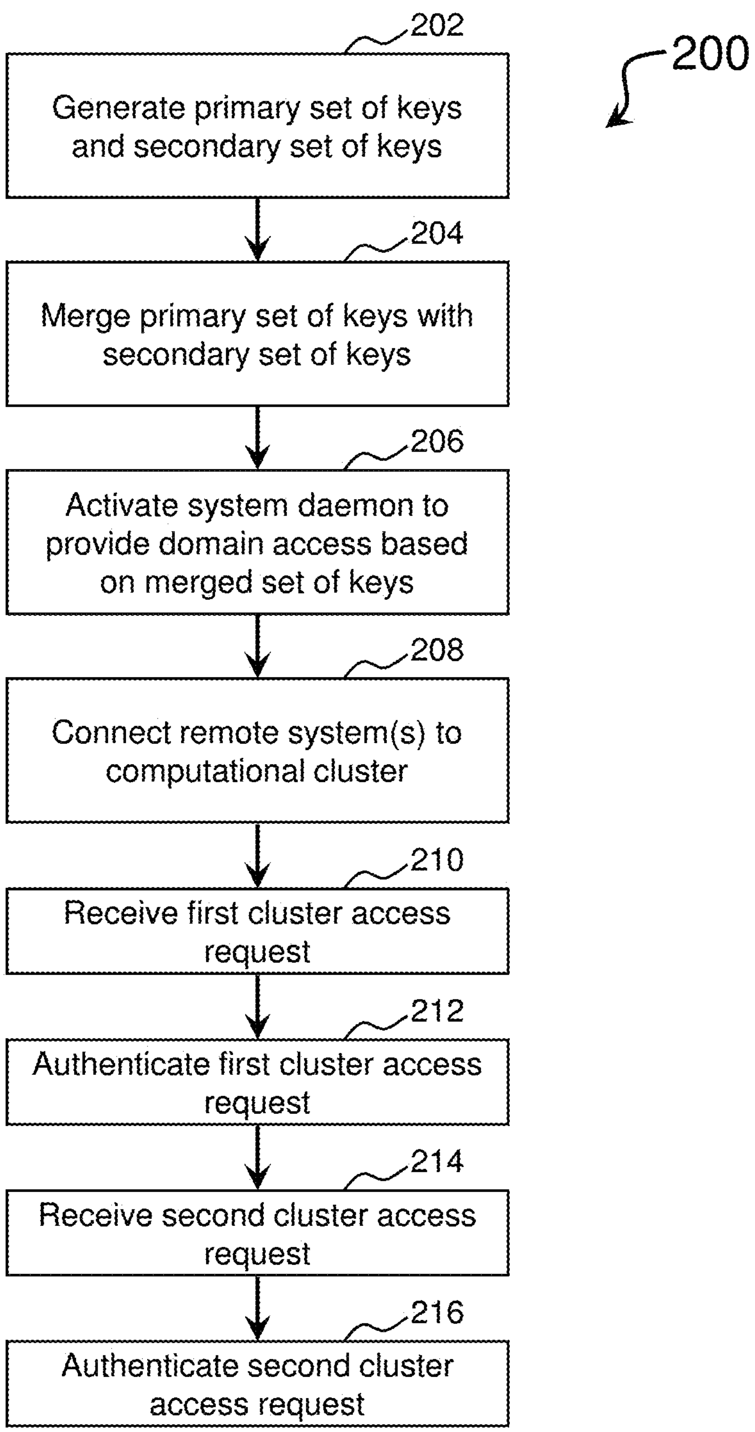
FIG. 2 is a flowchart illustrating a non-limiting embodiment of a method for managing computational cluster access to multiple domains according to the principles of the present disclosure.

Referring now to FIG. 2, illustrated is a flowchart of a non-limiting embodiment of a process 200 for managing computational cluster access to multiple domains. In some non-limiting embodiments, one or more of the steps of process 200 may be performed (e.g., completely, partially, and/or the like) by a control system 101 associated with the computational cluster 102 (e.g., one or more devices of computational cluster 102) and/or other devices of environment 100.

In step 202, a primary set of keys may be generated. For example, the control system 101 may generate a primary set of keys using a ticket-based computer network authentication protocol (e.g., Kerberos), based on remote system access credentials for a primary domain 104 and at least one secondary set of keys based on remote system access credentials for at least one secondary domain 106*a*,106*b*. "Credentials," as used herein, may refer to data that provides an entity with authorization to access a computer resource. "Remote system access credentials," as used herein, may refer to credentials that are used to provide an entity access to a computer system that is remotely accessible by a network. Credentials may be associated with a set of permissions, e.g., one or more actions that an entity is permitted to take when accessing a computer system. Permissions for one entity may differ from another.

In step 204, the primary set of keys may be merged with the at least one secondary set of keys to form a merged set of keys. For example, the control system 101 may merge the primary set of keys with the at least one secondary set of keys to form a merged set of keys. The merged set of keys may be stored in a system default key table, e.g., a file for storing long-term keys of one or more entities. In this manner, all requests to access a domain 104,106*a*,106*b* may utilize a single, default table of merged keys. Each key in the merged set of keys may include an identifier of a domain account (e.g., user account, service account) associated with an encryption key (e.g., a private key) necessary to encrypt or decrypt a ticket (e.g., a ticket associated with domain account) of the ticket-based computer network authentication protocol. The primary set of keys and the at least one secondary set of keys may include different sets of permissions of remote system access credentials.

In step 206, a system daemon (e.g., SSSD) 108 may be activated. For example, the control system 101 may activate a system daemon 108 to provide access (e.g., permitted communication) to the primary domain 104 and the at least one secondary domain 106*a*,106*b* by the computational cluster 102 based on the merged set of keys. In some non-limiting embodiments or aspects, the at least one secondary domain 106*a*,106*b* may be a plurality of secondary domains 106*a*,106*b*, e.g., two or more secondary domains 106*a*,106*b*, including more than the two shown for illustrative purposes. The ticket-based computer network authentication protocol of computational cluster 102 may be configured (e.g., communication parameters set) to communicate with primary domain 104 and one or more secondary domains 106*a*,106*b*. Configuring the ticket-based computer network authentication protocol may include activating an authentication service and a ticket-granting service on a domain controller for each of the primary domain 104 and the one or more secondary domains 106*a*,106*b*.

In step 208, one or more remote systems (e.g., computing devices thereof) may be connected to the computational cluster 102. For example, the control system 101 may connect one or more remote systems to the computational cluster 102 using the ticket-based computer network authentication protocol via the system daemon 108. The one or more remote systems may include a remote system of the primary domain 104, a remote system of the at least one secondary domain 106*a*,106*b*, or any combination thereof, to the computational cluster 102.

In step 210, a first cluster access request may be received. For example, the control system 101 may receive a first cluster access request to access a domain account associated with a remote computing device of the primary domain 104. A cluster access request may include a request for access from a computing device (e.g., server/node 103) of the computational cluster 102.

In step 212, the first cluster access request may be authenticated. For example, the control system 101 may authenticate the first cluster access request via the ticket-based computer network authentication protocol.

In step 214, a second cluster access request may be received. For example, the control system 101 may receive a second cluster access request to access a domain account associated with a remote computing device of the at least one secondary domain 106*a*,106*b*.

In step 216, the second cluster access request may be authenticated. For example, the control system 101 may authenticate the second cluster access request via the ticket-based computer network authentication protocol.

Figure 3:
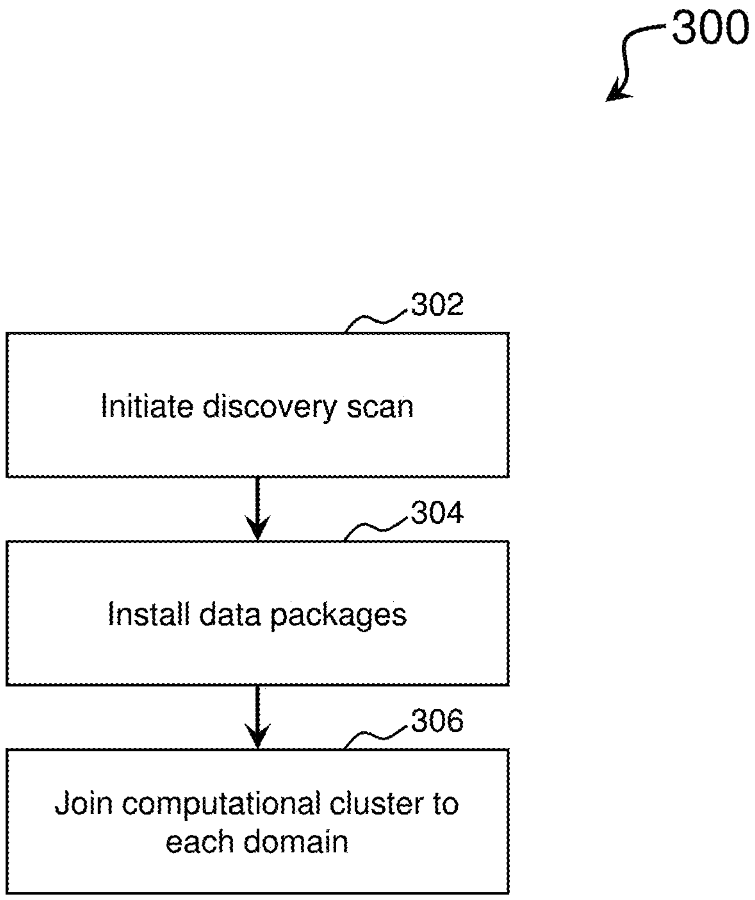
FIG. 3 is a flowchart illustrating a non-limiting embodiment of a method for managing computational cluster access to multiple domains according to the principles of the present disclosure.

Referring now to FIG. 3, illustrated is a flowchart of a non-limiting embodiment of a process 300 for managing computational cluster access to multiple domains. In some non-limiting embodiments, one or more of the steps of process 300 may be performed (e.g., completely, partially, and/or the like) by a system associated with computational cluster 102 (e.g., one or more devices of computational cluster 102) and/or other devices of environment 100.

In step 302, a discovery scan (e.g., ordered search to detect networked entities) may be initiated. For example, the control system 101 may initiate (e.g., begin a process with a processor) a discovery scan for each domain 104,106*a*, 106*b* associated with each set of keys. The discovery scan may browse devices communicatively connected in the communication network 110, such as using a Domain Name System (DNS) Service Discovery tool. In some non-limiting embodiments or aspects, the ticket-based computer network authentication protocol may be a Kerberos configuration, wherein the discovery scan may search for associated domains and return a complete domain configuration and list of packages that may be installed for the system to be enrolled in the associated domain.

In step 304, data packages (e.g., network configuration files) may be installed. For example, the control system 101 may install data packages required to join (e.g., establish an authorized communication channel with) the computational cluster 102 to each domain 104,106*a*,106*b*. Additionally or alternatively, the data packages may be identified in step 302 during the discovery scan. In some non-limiting embodiments or aspects, the ticket-based computer network authentication protocol may be a Kerberos configuration, wherein the package installation may be automatically triggered after completion of a discovery scan.

In step 306, the computational cluster 102 may be joined to each domain 104,106*a*,106*b*. For example, the control system 101 may join the computational cluster 102 to each domain 104,106*a*,106*b*. In some non-limiting embodiments or aspects, the ticket-based computer network authentication protocol may be a Kerberos configuration, wherein joining a domain may include creating an account entry for the control system 101 in a directory database of the domain.

Referring now to FIGS. 4A-4D, FIGS. 4A-4D are diagrams of an exemplary implementation 400 of a non-limiting embodiment or aspect relating to process 200 shown in FIG. 2 and/or process 300 shown in FIG. 3. As shown in FIGS. 4A-4D, implementation 400 may include computational cluster 402, node 403 (e.g., server), primary domain 404, secondary domain 406, primary domain key table 409, secondary domain key table 411, and merged key table 413. In some non-limiting embodiments or aspects, computational cluster 402 may be the same as or similar to computational cluster 102. In some non-limiting embodiments or aspects, node 403 may be the same as or similar to node 103. In some non-limiting embodiments or aspects, primary domain 404 may be the same as or similar to primary domain 104. In some non-limiting embodiments or aspects, secondary domain 406 may be the same as or similar to secondary domain 106*a*,106*b*.

Figure 4A:
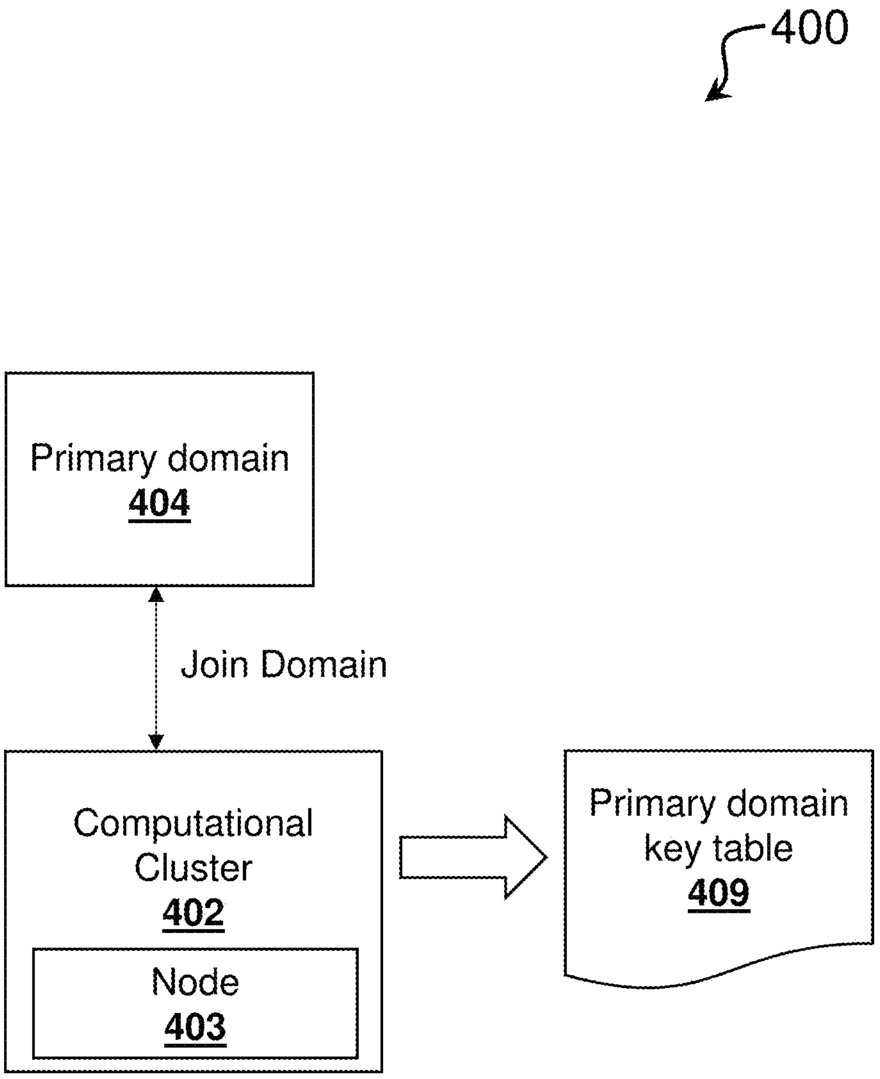
FIGS. 4A-4D are diagrams illustrating an exemplary implementation of a non-limiting embodiment or aspect relating to the process of FIG. 2 and/or the process of FIG. 3 according to the principles of the present disclosure.

As shown in FIG. 4A, implementation 400 may include a node 403 of computational cluster 402 joining primary domain 404, as described herein. The join operation may generate a primary domain key table 409. The primary domain key table 409 may be a primary set of keys, as described herein. The primary domain key table 409 may be stored in a database associated with computational cluster 402.

Figure 4B:
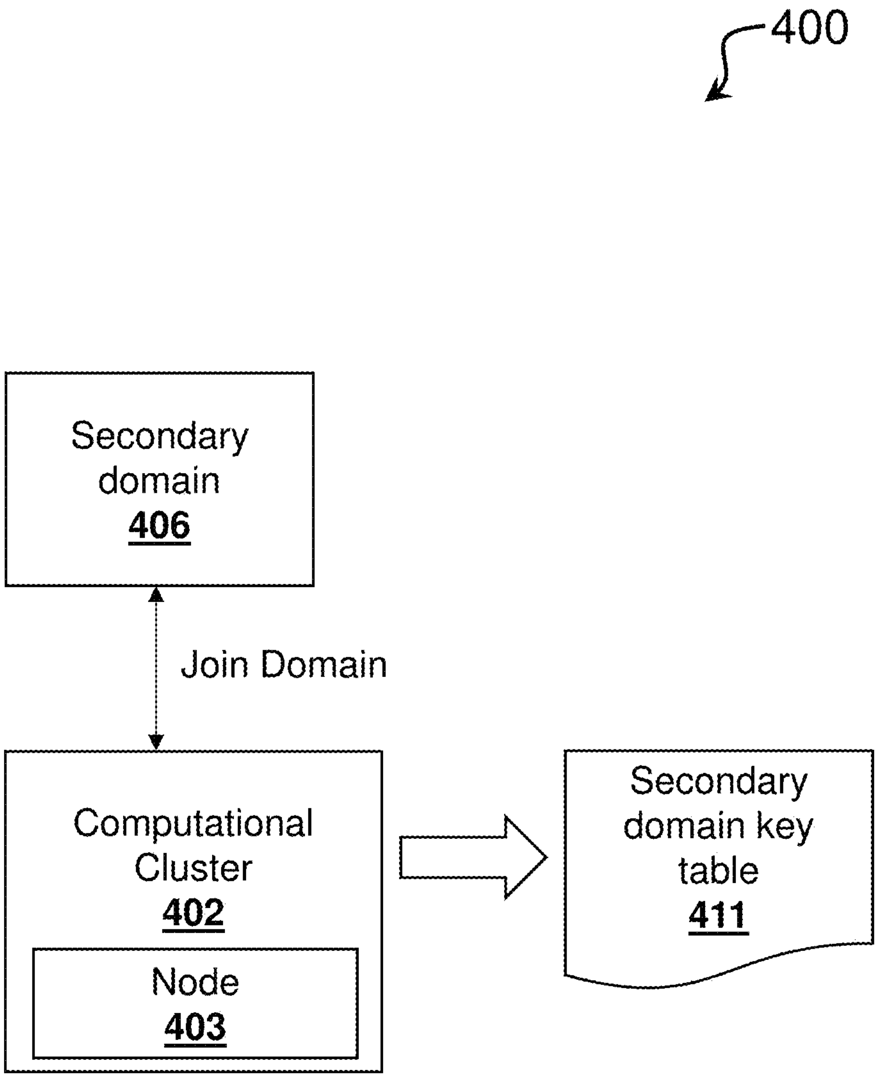

As shown in FIG. 4B, implementation 400 may include a node 403 of computational cluster 402 joining secondary domain 406, as described herein. The join operation may generate a secondary domain key table 411. The secondary domain key table 411 may be one of at least one secondary set of keys, as described herein. The secondary domain key table 411 may be stored in a database associated with computational cluster 402.

Figure 4C:
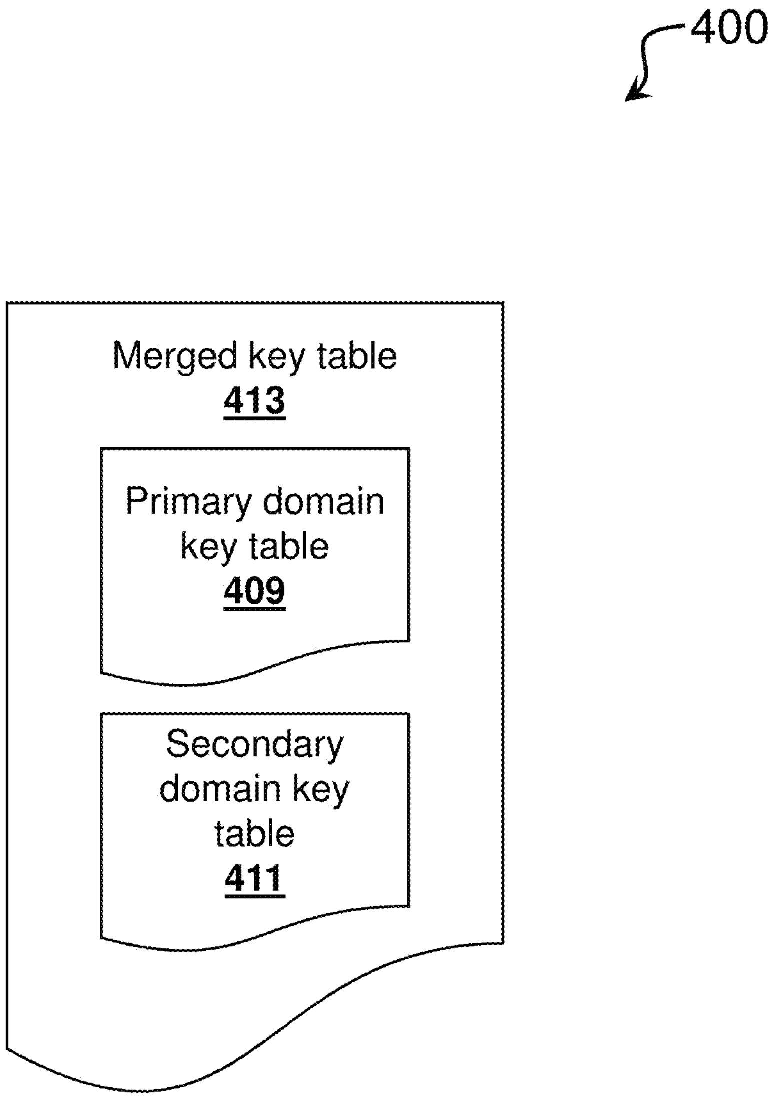

As shown in FIG. 4C, implementation 400 may include merging the primary domain key table 409 and the secondary domain key table 411. For example, the node 403, the computational cluster 402, and/or a control system associated with the computational cluster 402 may merge the primary domain key table 409 and the secondary domain key table 411 to form a merged key table 413. The merged key table 413 may be a merged set of keys, as described herein. The merged key table 413 may be set as the system default key table of a system daemon for the node 403.

Figure 4D:
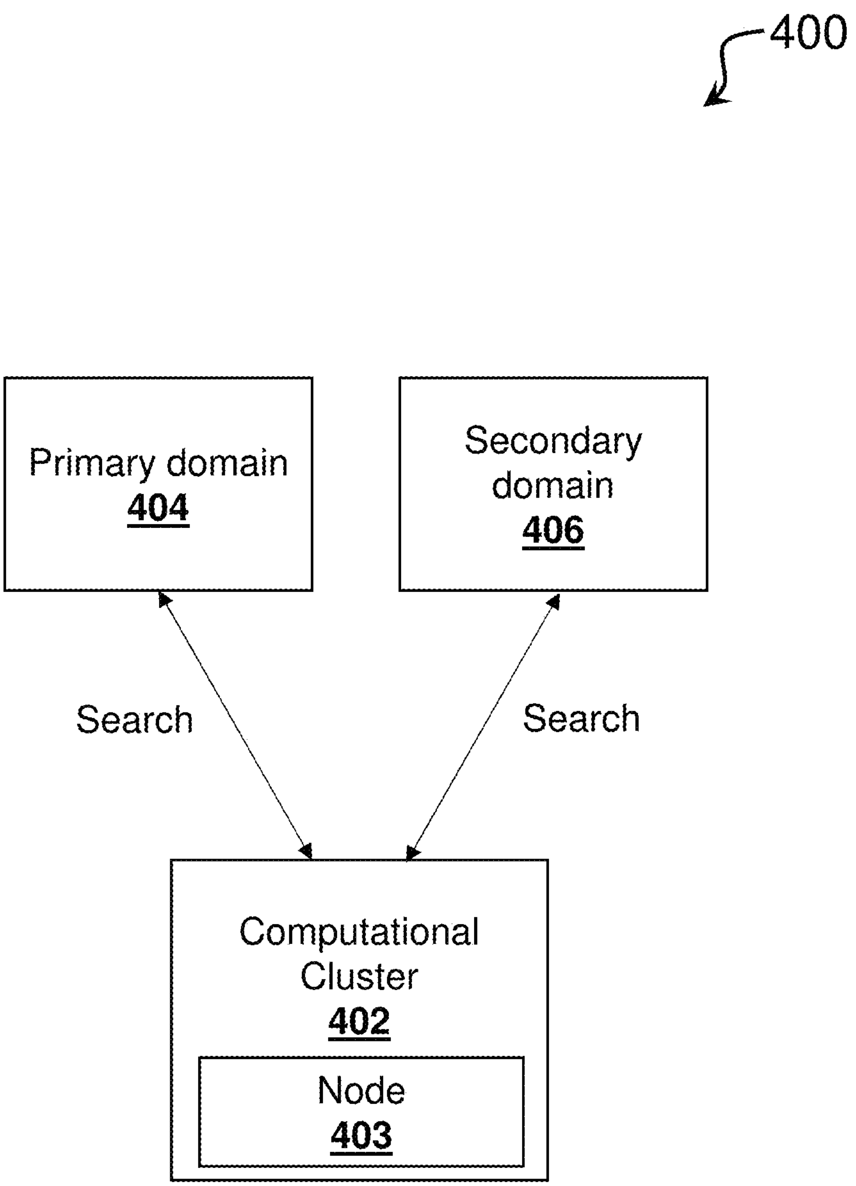

As shown in FIG. 4D, implementation 400 may include operation of a node 403 to access primary domain 404 and secondary domain 406. In some non-limiting embodiments or aspects, after node 403 has joined both the primary domain 404 and the secondary domain 406, a system daemon within the node 403 may use a system default key table (e.g., merged key table 413) of the system daemon, to access the primary domain 404 and the secondary domain 406. The node 403 may be now enabled to search for and access users, services, and groups in either domain 404,406. There may be no need to specify which domain 404,406 a user, group, or application is in by operation of the merged key table 413.

Figure 5:
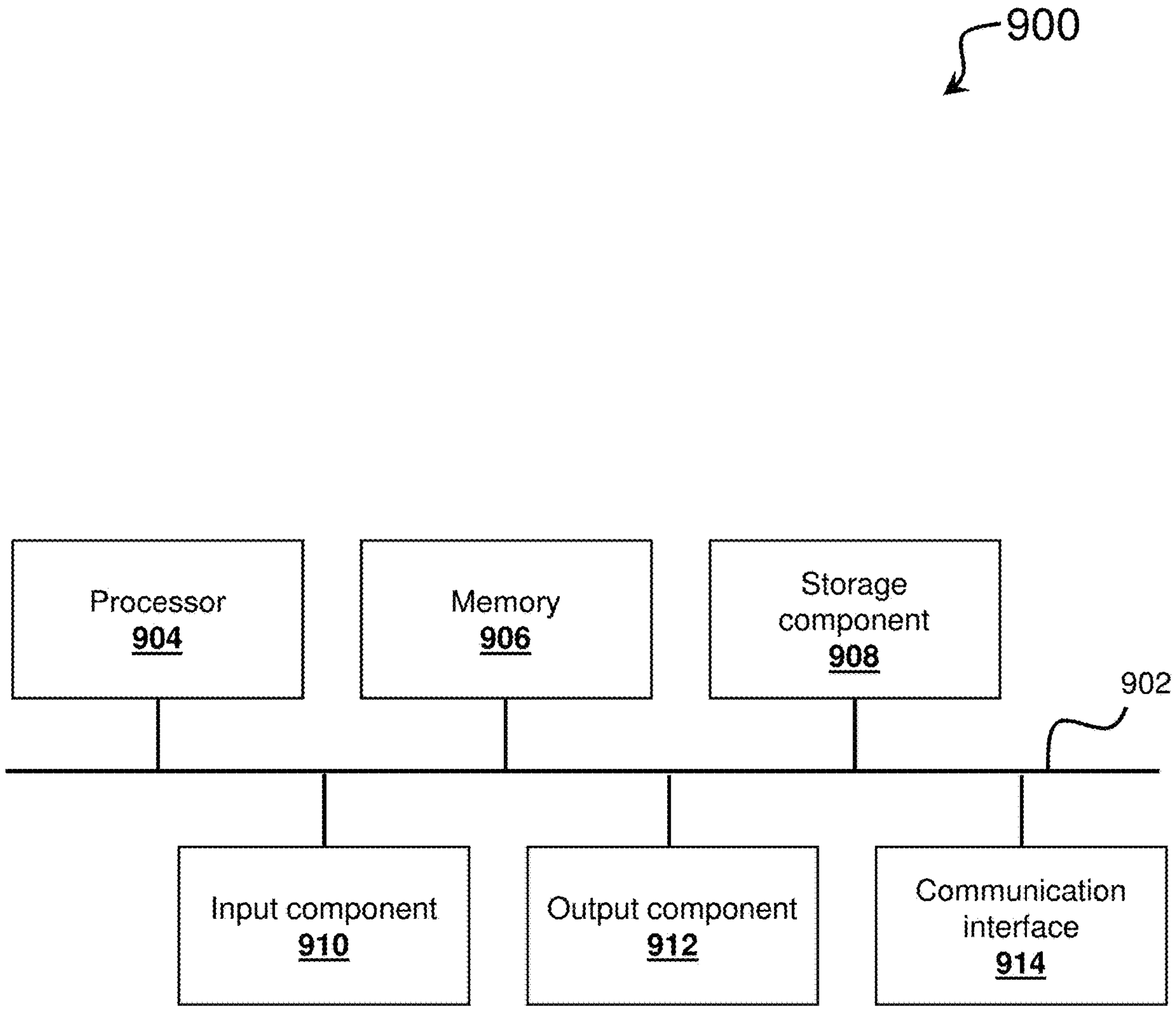
FIG. 5 is a diagram of a non-limiting embodiment of components of one or more devices of FIG. 1.

Referring now to FIG. 5, illustrated is a diagram of example components of device 900. Device 900 may correspond to one or more devices of computational cluster 102, one or more devices of primary domain 104, one or more devices of one or more secondary domains 106*a*,106*b*, one or more devices of a server/node 103, one or more devices of system daemon 108, and/or one or more devices of communication network 110. In some non-limiting embodiments or aspects, one or more devices of the foregoing may include at least one device 900 and/or at least one component of device 900. As shown in FIG. 5, device 900 may include bus 902, processor 904, memory 906, storage component 908, input component 910, output component 912, and communication interface 914.

Bus 902 may include a component that permits communication among the components of device 900. In some non-limiting embodiments or aspects, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read-only memory (ROM), and/or another type of dynamic or static storage device (e.g., flash memory, magnetic memory, optical memory, etc.) that stores information and/or instructions for use by processor 904.

Storage component 908 may store information and/or software related to the operation and use of device 900. For example, storage component 908 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 910 may include a component that permits device 900 to receive information, such as via user input (e.g., a touchscreen display, a keyboard, a keypad, a mouse, a button, a switch, a microphone, a camera, etc.). Additionally or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.).

Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 906 and/or storage component 908 may include data storage or one or more data structures (e.g., a database, and/or the like). Device 900 may be capable of receiving information from, storing information in, communicating information to, or searching information stored in the data storage or one or more data structures in memory 906 and/or storage component 908. For example, the information may include encryption data, input data, output data, transaction data, account data, or any combination thereof.

The number and arrangement of components shown in FIG. 5 are provided as an example. In some non-limiting embodiments or aspects, device 900 may include additional components, fewer components, different components, or differently arranged components than those shown in FIG. 5. Additionally or alternatively, a set of components (e.g., one or more components) of device 900 may perform one or more functions described as being performed by another set of components of device 900.

With further reference to the foregoing figures, the described implementation scheme may be executed for a Hadoop cluster/application connectivity with multiple Active Directory domains. Included are technical solutions to configure Kerberos to use dual or higher plurality realms, and to configure a System Security Services Daemon (SSSD) to utilize two or more domains.

In a first step, a system (e.g., control system 101) associated with a Hadoop cluster (e.g., computational cluster 102) may, on a Unix client, configure Kerberos (e.g., ticket-based computer network authentication protocol) to use dual realms. The configuration may specify the Kerberos Key Distribution Center (KDC) for each realm. Each realm may correspond to an Active Directory domain (e.g., primary domain 104, one or more secondary domains 106*a*,106*b*, and/or the like). Each KDC of a respective realm may be an Active Directory domain controller of the domain. In a second step, the system associated with the Hadoop cluster may obtain a Kerberos ticket-granting ticket (TGT) for a user from a primary Active Directory domain of a default Kerberos realm.

In a third step, the system associated with the Hadoop cluster may validate that the Unix client can be found in a domain controller of the primary, default domain (e.g., primary domain 104). In a fourth step, the system associated with the Hadoop cluster may use the "realm join" command to join each domain. At the completion of the join operation, the resultant key table may be saved as the key table for the respective domain.

In a fifth step, the system associated with the Hadoop cluster may merge the two key tables (e.g., "keytabs"), one for each Active Directory domain, into a single key table. The system may deploy the merged key table as the default, system-wide key table. In a sixth step, the system associated with the Hadoop cluster may validate the presence of the client host in the merged key table file. In a seventh step, the system associated with the Hadoop cluster may validate that the client can search each domain, proving access to the domain controller using Kerberos is working effectively.

In an eighth step, the system associated with the Hadoop cluster may configure the SSSD (e.g., system daemon 108) to utilize both domains. Each domain may specify its KDC. In a ninth step, the system associated with the Hadoop cluster may validate the status of the SSSD, determining that the SSSD recognizes both domains. In a tenth step, the system associated with the Hadoop cluster may validate that each domain is known and discoverable, e.g., validate that each KDC is discoverable.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system comprising:

at least one processor configured to:

join at least one node of a computational cluster to a primary domain, wherein joining the at least one node to the primary domain generates a primary key table, the primary key table associated with a first set of permissions for remotely accessing a computer resource of the primary domain;

join the at least one node of the computational cluster to a secondary domain, wherein joining the at least one node to the secondary domain generates a secondary key table, the secondary key table associated with a second set of permissions for remotely accessing a computer resource of the secondary domain;

merge the primary key table with the secondary key table to form a merged key table, wherein each key of the merged key table comprises an identifier of a domain account associated with an encryption key necessary to encrypt or decrypt a ticket of a ticket-based computer network authentication protocol;

connect a remote computing device of the primary domain and a remote computing device of the secondary domain to the computational cluster;

authenticate a first cluster access request and a second cluster access request via the ticket-based computer network authentication protocol;

deploy the merged key table as a system default key table for a system daemon operated on the at least one node, wherein the system daemon uses the merged key table to access the primary domain and the secondary domain without a respective access request specifying which domain the respective access request pertains to;

permit access by the computational cluster to perform a first action based on the first cluster access request, the first action requiring access to a first domain account associated with the remote computing device of the primary domain and being permissible based on the merged key table; and permit access by the computational cluster to perform a second action based on the second cluster access request, the second action requiring access to a second domain account associated with the remote computing device of the secondary domain and being permissible based on the merged key table.

2. The system of claim 1, wherein the at least one processor is further configured to activate the system daemon operated on the at least one node of the computational cluster.

3. The system of claim 2, wherein, when connecting the remote computing device of the primary domain and the remote computing device of the secondary domain to the computational cluster, the at least one processor is configured to:

connect the remote computing device of the primary domain and the remote computing device of the secondary domain to the computational cluster using the ticket-based computer network authentication protocol via the system daemon.

4. The system of claim 3, wherein, when permitting access by the computational cluster to perform the first action, the at least one processor is configured to:

permit, using the system daemon, access by the computational cluster to perform the first action; and wherein, when permitting access by the computational cluster to perform the second action, the at least one processor is configured to:

permit, using the system daemon, access by the computational cluster to perform the second action.

5. The system of claim 1, wherein the at least one processor is further configured to configure the ticket-based computer network authentication protocol to communicate with the primary domain and the secondary domain.

6. The system of claim 5, wherein, when configuring the ticket-based computer network authentication protocol, the at least one processor is further configured to activate an authentication service and a ticket-granting service on a domain controller for each of the primary domain and the secondary domain.

7. The system of claim 1, wherein the at least one processor is further configured to:

initiate a discovery scan for each domain associated with the primary key table and the secondary key table;

install data packages required to join the computational cluster to each domain associated with the primary key table and the secondary key table; and create an account entry for the computational cluster for each domain associated with the primary key table and the secondary key table.

8. A computer-implemented method comprising:

joining, with at least one processor, at least one node of a computational cluster to a primary domain, wherein joining the at least one node to the primary domain generates a primary key table, the primary key table associated with a first set of permissions for remotely accessing a computer resource of the primary domain;

joining, with the at least one processor, the at least one node of the computational cluster to a secondary domain, wherein joining the at least one node to the secondary domain generates a secondary key table, the secondary key table associated with a second set of permissions for remotely accessing a computer resource of the secondary domain;

merging, with the at least one processor, the primary key table with the secondary key table to form a merged key table, wherein each key of the merged key table comprises an identifier of a domain account associated with an encryption key necessary to encrypt or decrypt a ticket of a ticket-based computer network authentication protocol;

connecting, with the at least one processor, a remote computing device of the primary domain and a remote computing device of the secondary domain to the computational cluster;

authenticating, with the at least one processor, a first cluster access request and a second cluster access request via the ticket-based computer network authentication protocol;

deploying, with the at least one processor, the merged key table as a system default key table for a system daemon operated on the at least one node, wherein the system daemon uses the merged key table to access the primary domain and the secondary domain without a respective access request specifying which domain the respective access request pertains to;

permitting, with the at least one processor, access by the computational cluster to perform a first action based on the first cluster access request, the first action requiring access to a first domain account associated with the remote computing device of the primary domain and being permissible based on the merged key table; and permitting, with the at least one processor, access by the computational cluster to perform a second action based on the second cluster access request, the second action requiring access to a second domain account associated with the remote computing device of the secondary domain and being permissible based on the merged key table.

9. The method of claim 8, further comprising activating, with at least one processor, the system daemon operated on the at least one node of the computational cluster.

10. The method of claim 9, wherein connecting the remote computing device of the primary domain and the remote computing device of the secondary domain to the computational cluster comprises:

connecting the remote computing device of the primary domain and the remote computing device of the secondary domain to the computational cluster using the ticket-based computer network authentication protocol via the system daemon.

11. The method of claim 10, wherein permitting access by the computational cluster to perform the first action comprises:

permitting, using the system daemon, access by the computational cluster to perform the first action; and wherein permitting access by the computational cluster to perform the second action comprises:

permitting, using the system daemon, access by the computational cluster to perform the second action.

12. The method of claim 8, further comprising configuring, with the at least one processor, the ticket-based computer network authentication protocol to communicate with the primary domain and the secondary domain.

13. The method of claim 12, wherein configuring the ticket-based computer network authentication protocol comprises activating an authentication service and a ticket-granting service on a domain controller for each of the primary domain and the secondary domain.

14. The method of claim 8, further comprising:

initiating, with the at least one processor, a discovery scan for each domain associated with the primary key table and the secondary key table;

installing, with the at least one processor, data packages required to join the computational cluster to each domain associated with the primary key table and the secondary key table; and creating, with the at least one processor, an account entry for the computational cluster for each domain associated with the primary key table and the secondary key table.

15. A computer program product comprising at least one non-transitory computer-readable medium including program instructions that, when executed by at least one processor, cause the at least one processor to:

join at least one node of a computational cluster to a primary domain, wherein joining the at least one node to the primary domain generates a primary key table, the primary key table associated with a first set of permissions for remotely accessing a computer resource of the primary domain;

join the at least one node of the computational cluster to a secondary domain, wherein joining the at least one node to the secondary domain generates a secondary key table, the secondary key table associated with a second set of permissions for remotely accessing a computer resource of the secondary domain;

merge the primary key table with the secondary key table to form a merged key table, wherein each key of the merged key table comprises an identifier of a domain account associated with an encryption key necessary to encrypt or decrypt a ticket of a ticket-based computer network authentication protocol;

connect a remote computing device of the primary domain and a remote computing device of the secondary domain to the computational cluster;

authenticate a first cluster access request and a second cluster access request via the ticket-based computer network authentication protocol;

deploy the merged key table as a system default key table for a system daemon operated on the at least one node, wherein the system daemon uses the merged key table to access the primary domain and the secondary domain without a respective access request specifying which domain the respective access request pertains to;

permit access by the computational cluster to perform a first action based on the first cluster access request, the first action requiring access to a first domain account associated with the remote computing device of the primary domain and being permissible based on the merged key table; and permit access by the computational cluster to perform a second action based on the second cluster access request, the second action requiring access to a second domain account associated with the remote computing device of the secondary domain and being permissible based on the merged key table.

16. The computer program product of claim 15, wherein the program instructions further cause the at least one processor to activate the system daemon operated on the at least one node of the computational cluster.

17. The computer program product of claim 16, wherein the program instructions that cause the at least one processor to connect the remote computing device of the primary domain and the remote computing device of the secondary domain to the computational cluster cause the at least one processor to:

connect the remote computing device of the primary domain and the remote computing device of the secondary domain to the computational cluster using the ticket-based computer network authentication protocol via the system daemon.

18. The computer program product of claim 17, wherein the program instructions that cause the at least one processor to permit access by the computational cluster to perform the first action cause the at least one processor to:

permit, using the system daemon, access by the computational cluster to perform the first action; and wherein the program instructions that cause the at least one processor to permit access by the computational cluster to perform the second action cause the at least one processor to:

permit, using the system daemon, access by the computational cluster to perform the second action.

19. The computer program product of claim 15, wherein the program instructions further cause the at least one processor to configure the ticket-based computer network authentication protocol to communicate with the primary domain and the secondary domain, and wherein the program instructions that cause the at least one processor to configure the ticket-based computer network authentication protocol cause the at least one processor to activate an authentication service and a ticket-granting service on a domain controller for each of the primary domain and the secondary domain.

20. The computer program product of claim 15, wherein the program instructions further cause the at least one processor to:

initiate a discovery scan for each domain associated with the primary key table and the secondary key table;

install data packages required to join the computational cluster to each domain associated with the primary key table and the secondary key table; and create an account entry for the computational cluster for each domain associated with the primary key table and the secondary key table.

* * * * *